United States Patent
McBrearty et al.

(10) Patent No.: US 6,636,984 B1
(45) Date of Patent: Oct. 21, 2003

(54) SYSTEM AND METHOD FOR RECOVERING DATA FROM MIRROR DRIVES FOLLOWING SYSTEM CRASH

(75) Inventors: Gerald Francis McBrearty, Austin, TX (US); Shawn Patrick Mullen, Buda, TX (US); Ramalingeswar Pandiri, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 09/595,348

(22) Filed: Jun. 15, 2000

(51) Int. Cl.⁷ .................................................. G06F 11/00
(52) U.S. Cl. .............................. 714/6; 714/5; 711/112; 711/114
(58) Field of Search ...................... 714/5, 6; 711/114, 711/112

(56) References Cited

U.S. PATENT DOCUMENTS

| | | | | |
|---|---|---|---|---|
| 5,488,731 A | * | 1/1996 | Mendelsohn | 711/114 |
| 5,590,276 A | * | 12/1996 | Andrews | 714/6 |
| 5,727,144 A | * | 3/1998 | Brady et al. | 714/6 |
| 5,897,661 A | * | 4/1999 | Baranovsky et al. | 711/170 |
| 6,158,017 A | * | 12/2000 | Han et al. | 714/6 |
| 6,260,124 B1 | * | 7/2001 | Crockett et al. | 711/162 |
| 6,269,453 B1 | * | 7/2001 | Krantz | 714/6 |
| 6,327,672 B1 | * | 12/2001 | Wilner | 714/6 |

* cited by examiner

Primary Examiner—Robert Beausoliel
Assistant Examiner—Yolanda L. Wilson
(74) Attorney, Agent, or Firm—Joseph T. Van Leeuwen; Diana L. Roberts; Volel Emile (57) ABSTRACT

A system and method for recovering data from parallel mirror drives following a system crash. During a parallel write to a mirrored disk array, it is unknown which of the disks comprising the disk array write the data to disk first. A completion array is used to record the first disk that stores a data item at a given address. During recovery from a system failure, the completion array is read to identify the last writes performed before the system failure occurred. The disk identified in the completion array is used as the master disk for the particular address identified. Data is read from that disk and address and propagated to the other disks in the mirrored disk array. Other items in the completion array may identify different disks to be used as the master for other addresses. In one embodiment, the completion array is stored in a reserved area of memory that is dumped to disk during a system failure and restored from disk during a subsequent system recovery. In one embodiment, a mirror write consistency check (MWCC) is used in conjunction with the completion array to record writes that are about to occur to the drive array as well as the first drive to successfully store the data. A computer system and a computer program product for recovering from system, failure using a parallel mirror drive array are further disclosed.

22 Claims, 7 Drawing Sheets

SYSTEM AND METHOD FOR RECOVERING DATA FROM MIRROR DRIVES FOLLOWING SYSTEM CRASH

BACKGROUND OF THE INVENTION

1. Technical Field

The present invention relates in general to a method and system for recovering data from mirror drives following a system failure. Still more particularly, the present invention relates to method for recovering data from parallel mirror drives by recording the first drive to store a data item.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives (nonvolatile storage devices) are also considered to be peripheral devices. Data stored on nonvolatile storage devices is often extremely critical to an organization. Due to their critical nature, nonvolatile storage devices are often backed up on a regular basis in case a disaster or other failure occurs to the computer system and the nonvolatile storage devices attached to it.

Backing up a nonvolatile storage device can be a slow process if the data is backed up onto another type of media, such as backing up a hard drive to a set of magnetic tapes. In addition, backups onto magnetic tapes may only occur on a periodic basis. For example, a system backup may be taken every night. Data to the nonvolatile storage device after the last backup is lost if a failure occurs destroying the nonvolatile storage device.

To provide greater data protection regarding a system's data stored on nonvolatile storage devices, many systems use drive arrays to increase capacity and reliability of their nonvolatile storage. Essentially, a drive array is a way to combine a number of individual nonvolatile storage devices to create a massive virtual system by connecting the separate drives to a single drive controller and coordinating their operation.

Several implementations of drive arrays have been developed to both increase capacity and reliability of nonvolatile storage. One method of implementing drive arrays is using Redundant Arrays of Inexpensive Disks, or "RAID," technology. RAID technology has various levels (i.e., RAID Level 0, 1, 2, 3, etc.). Each level is a different implementation of multiple disks. For example, RAID Level 1 refers mirroring the contents of one disk onto another disk. In this manner, if the first disk fails, the same data would be intact on the second disk. Conversely, if the second disk failed the data would be intact on the first disk.

Two basic approaches to mirrored disks are used. The first approach treats the first disk as the "master" disk and the second disk as the "backup" disk. Data is first written to the master disk by the controller and then written to the backup disk. This method is referred to as "sequential" mirroring because a master-subordinate relationship is used to control the disks. The disadvantage of sequential mirroring, however, is that it is relatively slow, requiring a sequential writing operation. If the master disk is busy while the backup disk is idle, the operation has to wait for the master disk even though the backup disk is ready.

The second approach to mirroring disks is referred to as "parallel" mirrors. As the name implies, data is written to the various disks that comprise the mirror in parallel. If the first disk is busy while the second disk is idle, the second disk can immediately store the data while the first data finishes its previous operation and then stores the data. Because of the parallel nature, however, no master-backup relationship exists. Consequently, when the system recovers from a failure (i.e., the system crashed), it is unknown which disk contains the latest information. Indeed, since the drives are operating in parallel, one drive may have the latest information for one disk address while another drive has the latest information for another disk address. Determining the latest data that resides on parallel mirrored disks is a challenge for drive manufacturers and their customers. This challenge is exacerbated by the fact that multiple mirror disks may exist (i.e., mirroring data across 3, or 4 disks rather than only having 2 disks).

In IBM's AIX operating system (similar to the UNIX operating system), a data queue is maintained that keeps track of the last 62 writes that are about to be written to disk. During recovery processing following a system failure, the disk controller reads the queue to attempt to synchronize the last 62 writes. Because no true master drive exists, the controller selects the first drive that will communicate with the controller and designates this drive to be the master drive. However, as discussed above, at the time of the crash the designated master may not have the latest data. This will result in older data being copied over newer data during system recovery. For example, if drive 1 is designated the master but drive 0 has the latest data in address 100 (data that was written to drive 0 just before the crash), the controller will copy the old data from address 100 on drive 1 to address 100 on drive 0 (thus replacing the new data in that address on drive 0). The "latest" data held on drive 0 is thereby overwritten. After the recovery operation, all mirror drives will once again be identical. By copying the data in this fashion, this method, known as a Mirror Write Consistency Check (MWCC), guarantees consistent, rather than the latest, data. Thus, a challenge of the prior art is determining which disk contains the latest data for a given disk address.

What is needed, therefore, is a way to identify the latest data residing on any one disk in a parallel mirror array. In addition, recording the latest data would be preferably performed quickly requiring few, if any, additional writes to the nonvolatile storage devices to record the information.

SUMMARY

It has been discovered that keeping a completion array in memory that keeps track of the first disk to complete a write operation provides for the latest data to be propagated to the other disks when a recovery from a system failure occurs. The in-memory array would keep track of the disk number that first successfully wrote data and returned the request along with the disk address where the data resides.

In another embodiment, the Mirror Write Consistency Check (MWCC) array is compared with the in-memory array during failure recovery to match the data that was about to be written in the MWCC with the data residing on the first disk identified in the completion array.

Upon a system failure, the in-memory array is written to a system dump area on the disk as there is a small window of time after a system failure where the status of the system is written to a nonvolatile storage area (i.e., nonvolatile memory, disk area, etc.). When the system is rebooted following the failure, the system identifies and rebuilds the array that was dumped to nonvolatile storage. The array is then processed identifying the disk containing the latest data for a particular disk address. That disk is used as the master disk for that particular disk address and the data is copied to the other disks. The next item in the array would contain the next disk address and the disk that first wrote the data to its platter. This process would continue until all items in the array have been read and the corresponding data copied to the disks.

In yet another embodiment, the completion array is written to nonvolatile storage as well as memory so that, upon recovering from a failure, the completion array can be read from the nonvolatile storage device and processed accordingly.

A computer system that uses a completion array to record disk writes and recover from system failures is further disclosed. In addition, a computer program product is disclosed for storing the method of recording the completion array and the method of recovering from a system failure using the stored completion array is further disclosed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
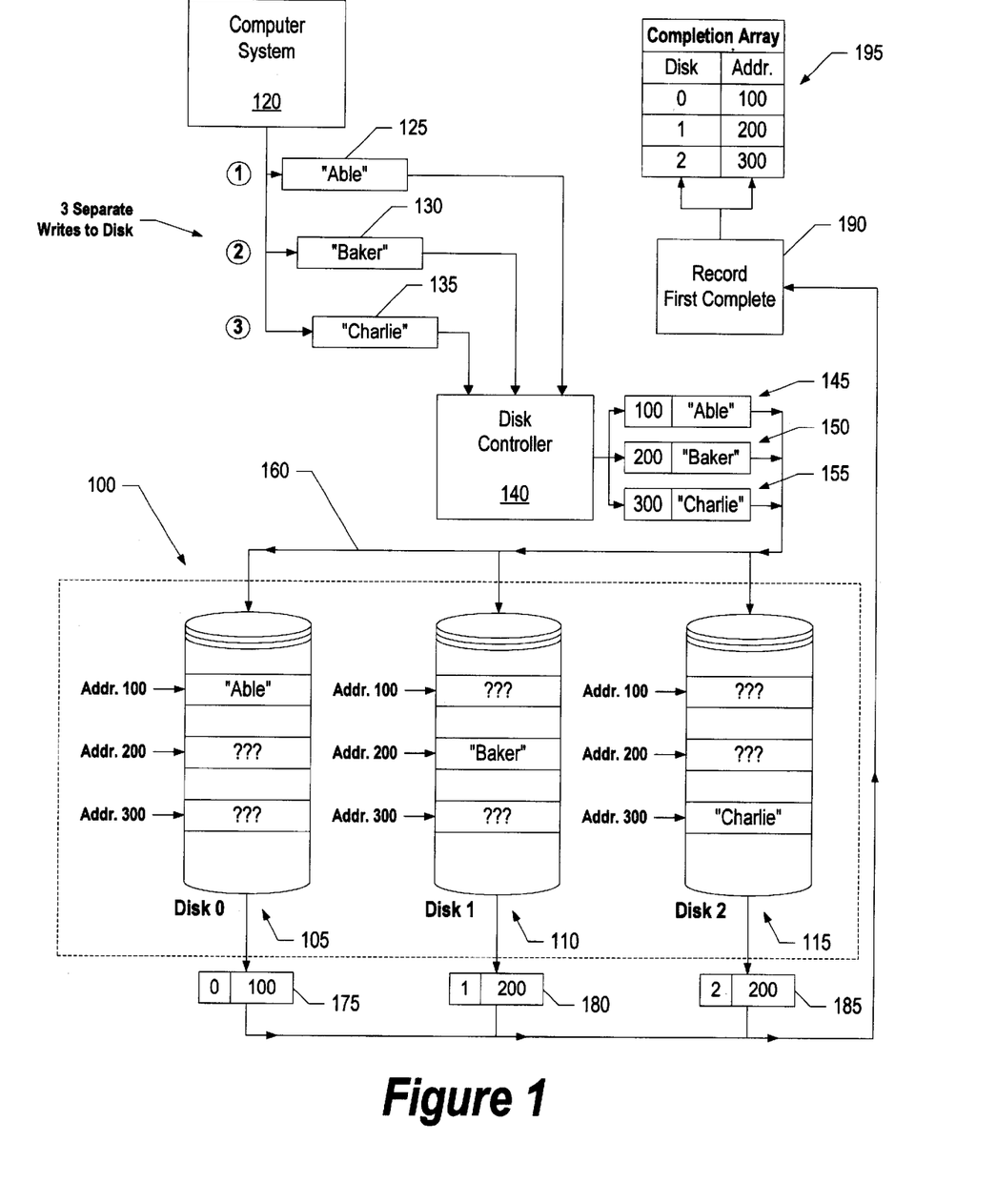
FIG. 1 is a block diagram of a completion array recording first disk written information.

FIG. 1 shows a block diagram of a system recording information about the first disk from a set of parallel mirror disks to successfully write data to an address. Computer system 120 is shown requesting to make three separate writes to parallel mirror array 100. In the example shown, computer system 120 is requesting to write the words "Able" (125), "Baker" (130), and "Charlie" (135) to nonvolatile storage. These requests are received by disk controller 140 which writes the data to parallel mirror array 100. Parallel mirror array 100 includes three disks, disk 0 (105), disk 1 (110), and disk 2 (115). Each of these disks is intended to contain an exact copy of the data stored on the other disks. In a parallel mirror methodology, disk controller 140 makes parallel writes to the different disks. Because of the parallel nature of the writes, no disk among parallel mirror array 100 necessarily receives data before the other disks.

Disk controller 140 determines a disk address at which to store the data (the disk address may also be provided by computer system 120). As shown, "Able" is placed into packet 145 to store the data at address 100 on all mirrored disks (disk 0 (105), disk 1 (110), and disk 2 (115)). Disk controller 140 issues parallel writes on data path 160 to the three mirrored disks. Disk controller 140 continues on storing "Baker" (packet 150) at address 200 on each disk within the parallel mirror array and storing "Charlie" (packet 155) at address 300 on each disk within the parallel mirror array.

Exactly when the individual disks store the information at the specified addresses is determined by the activity currently taking place in the particular drive. In the example shown, a certain amount of time after the parallel write was issued by controller 140, each of the drives contain different information. "Able" was stored at address 100 of disk 0, but has not yet been stored at address 100 of either disk 1 or disk 2. Likewise, "Baker" was stored at address 200 of disk 1, but has not yet been stored at address 200 of either disk 0 or disk 2. Similarly, "Charlie" has been stored at address 300 of disk 2 but has not yet been stored at address 300 of either disk 0 or disk 1. After the first write on any particular drive is complete, the disk number and address is processed by first disk complete recorder 190 and stored in completion array 195. When "Able" was stored on disk 0 at address 100, the disk number (0) and address (100) are sent (packet 175) to first disk complete recorder 190 and stored in completion array 195. Similarly, "Baker" and "Charlie" cause packets 180 and 185, respectively, to be sent to first disk complete recorder 190 and stored in completion array 195.

Figure 2:
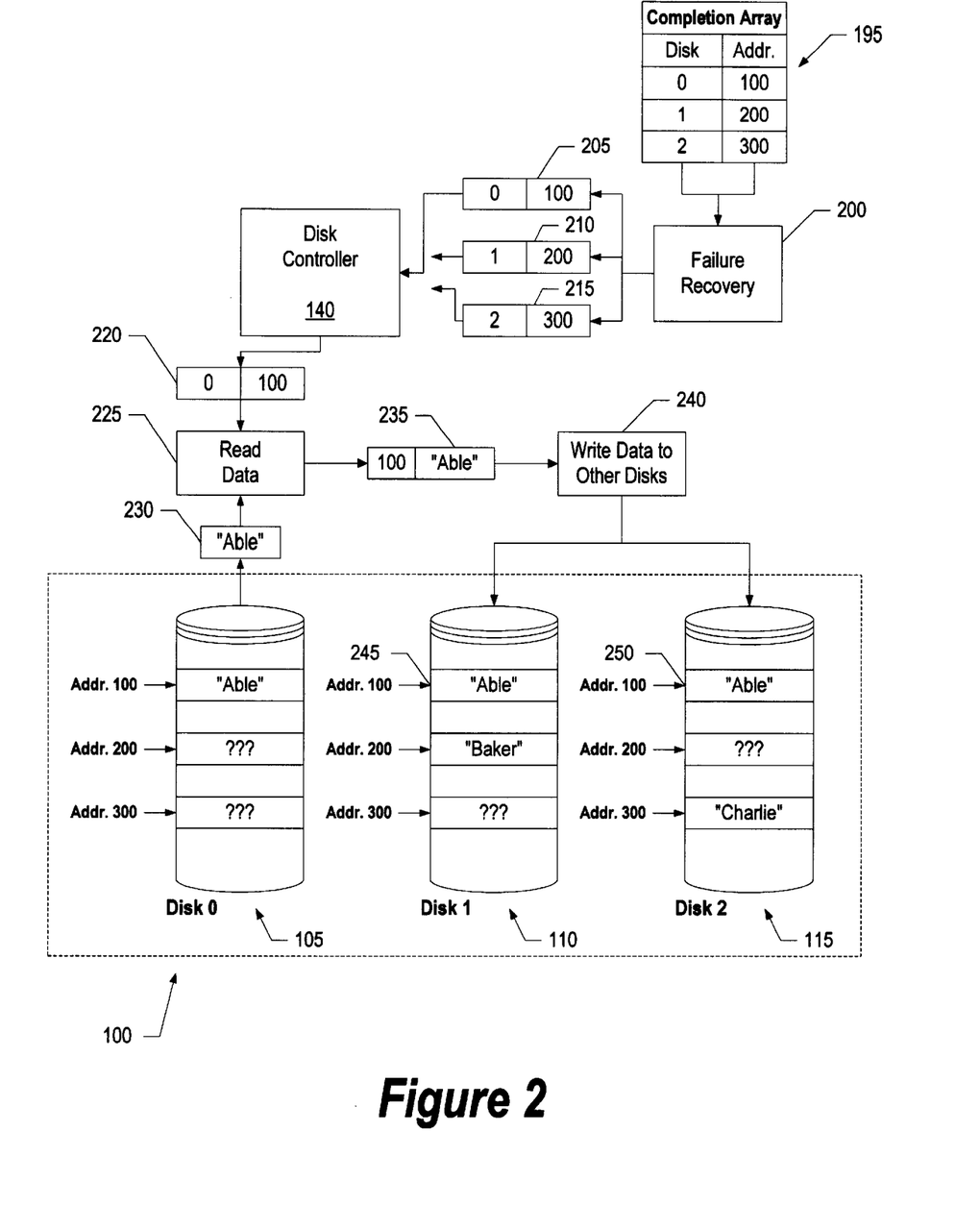
FIG. 2 is a block diagram of the completion array being used to restore files to mirror disks after a system failure.

In the example shown, a system failure occurs before either "Able," "Baker," or "Charlie" are stored at their respective locations on the remaining disks. Therefore, the contents of address 100 on disk 1 and 2 are unknown, the contents of address 200 on disk 0 and 2 are unknown, and the contents of address 300 on disk 0 and 1 are unknown. FIG. 2 will show how the data written to one of the mirrored disks is restored to the other disks in parallel mirror array 100.

FIG. 2 shows a block diagram of parallel mirror array 100 being restored following a reboot of computer system 120

(shown in FIG. 1). When the computer system is rebooted, or reinitialized, failure recovery module 200 restores data to parallel mirror array 100. Failure recovery module 200 reads completion array 195 that recorded the first disk from parallel mirror array 100 to successfully store data (see FIG. 1 for details on recording disks and addresses in completion array 195). Completion array 195 contains addresses, not the actual data, stored by the first drive to complete the write operation. Completion array 195 indicates that Disk 0 was the first drive to store data at address 100, Disk 1 was the first drive to store data at address 200, and Disk 2 was the first drive to store data at address 300. Failure recovery module 200 processes the items in completion array 195 in order to propagate any data onto the other drives that did not complete prior to the system failure. Recovery block 205 contains the first record from completion array 195 indicating that data was written to Disk 0 at address 100. Subsequent records from completion array 195, namely recovery blocks 210 and 215 will also be processed.

Following the recovery of data pointed to by recovery block 205, disk controller 140 is instructed to read the data from Disk 0 at address 100 (read instruction 220). Read data 225 receives the data, in this case return data 230 is the word "Able." Return data 230 is combined with the address, 100, forming write instruction 235. Write instruction 235 is processed by writing data to other disks routine 240 which writes the data onto the other disks, namely Disk 1 (110) at address 100 (245) and Disk 2 (115) at address 100 (250). After the write operations, each disk in parallel mirror array 100 contain the same data ("Able") at address 100.

Note that addresses 200 and 300 do not yet contain the same data on all three mirrored disks. However, once recovery blocks 210 and 215 are processed, each disk will be identical and contain the same information at addresses 100, 200, and 300.

The preferred embodiment keeps track of the first disk that stores the data in completion array 195. Retaining only the first disk increases the chance the redundant data is written to the other disks during recovery. For example, if "Charlie" was first written to Disk 2, and then written to Disk 1 before the system failure occurred, the recovery processing would treat Disk 2 as the master and copy the data ("Charlie") to address 300 of both Disk 0 and Disk 1 (even though Disk 1 already had the correct item stored at the address). However, retaining only the first disk (or any disk known to contain the correct data), keeps the size of completion array 195 to a minimum and facilitates storing more disk addresses in the reserved memory area. In addition, since recovery processing is usually a rare activity, a few additional writes occurring during recovery processing will not noticeably impact performance of the system. In some applications, however, it may be desirable to keep track of each disk in a mirrored array that actually stores the data. To provide this functionality, completion array 195 would be made larger to store multiple disk identifiers per address and first disk complete recorder 190 would be modified to record each disk that stores the data. During recovery processing, an address would be read from completion array 195 along with the identifier of each disk that has already stored the data at the address. The missing disk identifiers (addresses) would be determined by comparing the actual disk identifiers with the identifiers stored in completion array 195. Writing data to other disks routine 240 would then be modified to write the data to only the missing disks.

Figure 3:
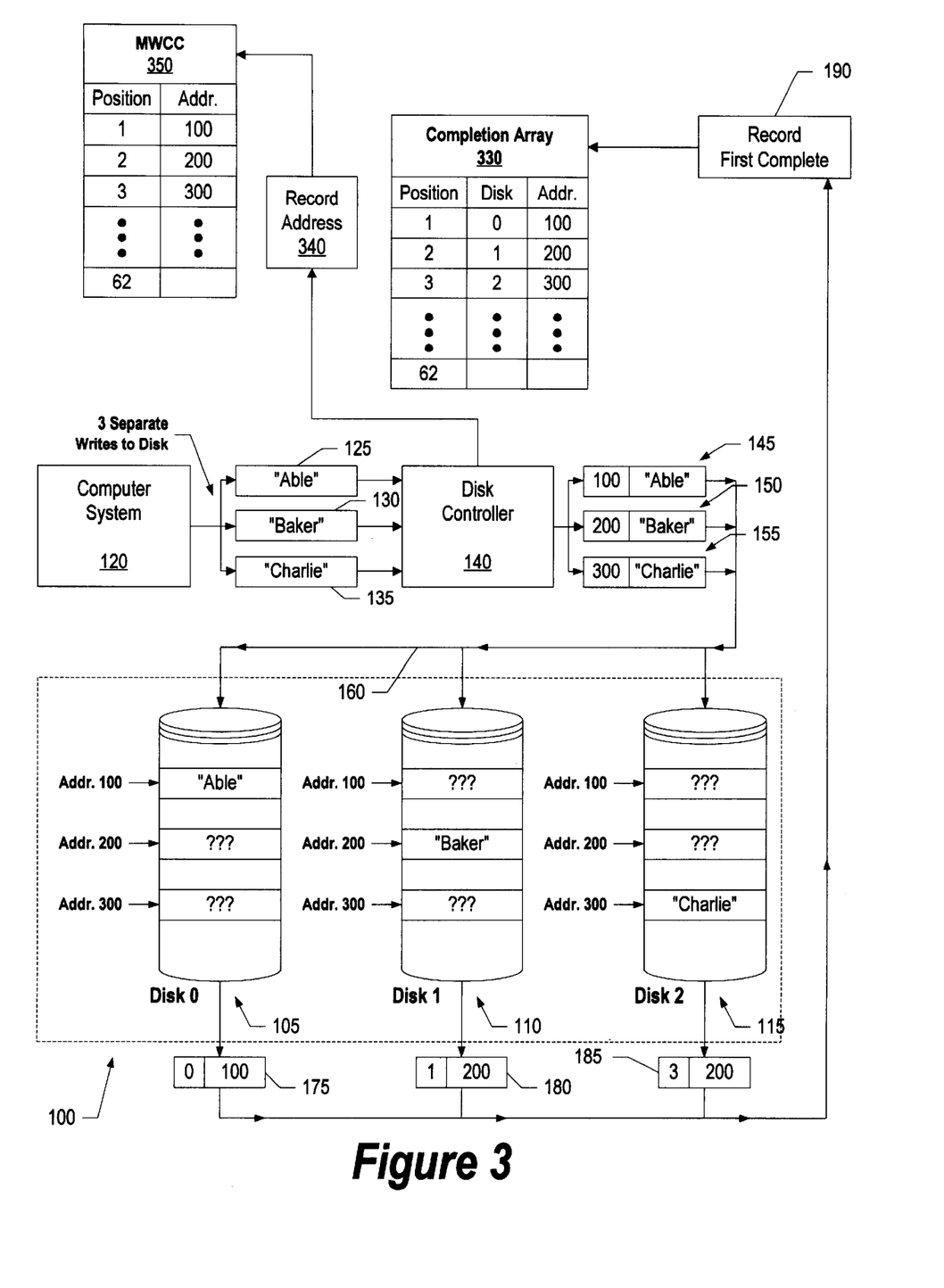
FIG. 3 is a block diagram of the mirror write consistency check array and the completion array being used to record disk write information.

FIG. 3 shows a block diagram combining the completion array introduced in FIG. 1 with a mirror write consistency check (MWCC) array 350 that tracks data that is about to be written to parallel mirror array 100. In this example, like the example shown in FIG. 1, computer system 120 requests three separate write operations before encountering a system failure. Computer system 120 requests that the words "Able" (125), "Baker" (130), and "Charlie" (135) be written to parallel mirror array 100. Before writing the data to the parallel mirror array, disk controller 140 passes the addresses that are about to be written to record address module 340. Record address module 340 records the corresponding addresses in MWCC array 350. MWCC array 350 is a 62 record first-in-first-out (FIFO) queue. In one embodiment, MWCC array 350 is written to disk after each new entry is made so that it can be easily recovered following a system failure. As shown, MWCC array 350 contains the addresses that are about to be written to disk, namely addresses 100, 200, and 300. Disk controller 140 then issues parallel write commands to the disks comprising parallel mirror array 100 (Disk 0 (105), Disk 1 (110), and Disk 2 (115)). The first disk that writes a given address is returned where it is recorded in completion array 330 by record first complete module 190 (see detailed description in FIG. 1). Completion array 330 is also shown as a FIFO queue of 62 entries. In addition to the address written, completion array 330 also contains the disk that first wrote data to the address. In this manner, it is known that the latest data resides on the disks/addresses shown in completion array 330 while it is unknown whether the other disks within parallel mirror array 100 contain the latest data at these addresses.

Figure 4:
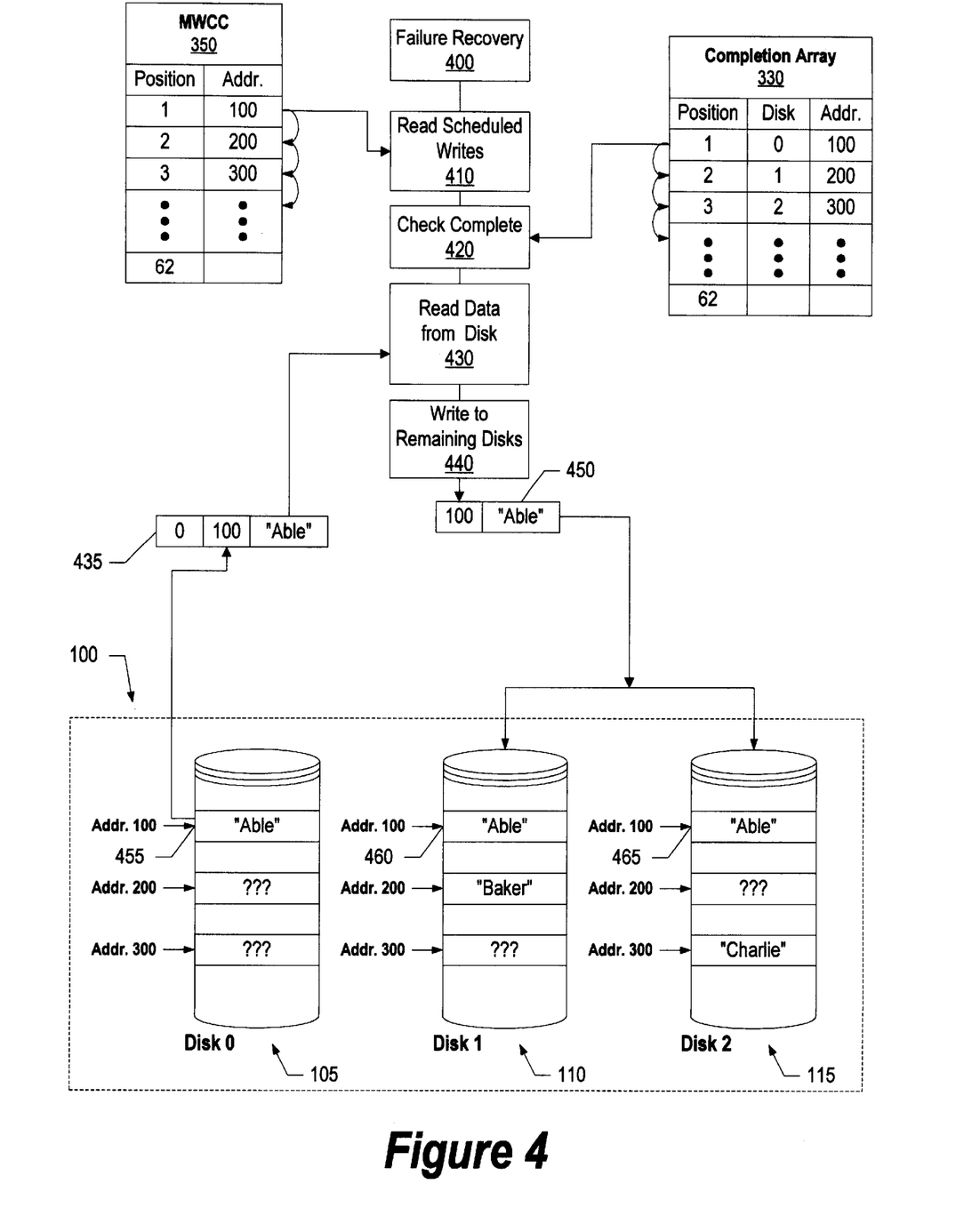
FIG. 4 is a block diagram of the mirror write consistency check array and the completion array being used to restore mirror disks after a system failure.

FIG. 4 shows how MWCC array 350 can be used in conjunction with completion array 330 to restore data within parallel mirror array 100 following a system failure. Failure recovery module 400 is entered when the computer system is rebooted or reinitialized after a system error. In one embodiment, failure recovery module 400 is performed each time the system is booted to check the consistency of data within parallel mirror array 100. Failure recovery module 400 first reads the scheduled writes (step 410) that were supposed to be written to parallel mirror array 100 and recorded in MWCC array 350. As described in FIG. 3, in one embodiment MWCC array 350 is written to disk after each entry is added, therefore MWCC array 350 can be read from disk and placed in memory for processing. In another embodiment, MWCC array 350 is stored in a reserved place in memory that is dumped during to nonvolatile storage during a system failure (see the description of dumping the completion array to disk in FIG. 1). In this embodiment, MWCC array 350 is identified in the system dump area and restored to memory during a reboot following a system failure.

Each of the scheduled writes read from MWCC array 350 is checked against completion array 350 to determine whether the data was written to at least one disk before the system failed (step 420). If the address is not found in the completion array 330, then the data was not completely written to any disks. In this case, the system defaults to an algorithm of picking the first available responding disk from parallel mirror array 100 and using that disk as the master to copy over the other mirrors. After this is complete, processing continues to the next item in MWCC array 350. If the data was written to at least one disk, completion array 330 recorded the first disk to store the data. This disk and address are used to read the data (step 430) from the disk identified in completion array 330. In the example shown, the word "Able" is read from Disk 0/Address 100 (location 455). The data read is then written (step 440) to the other disks comprising parallel mirror array 100, in this case Disks 1 and 2. Write block 450 includes the address (100) and the data ("Able") to be written to the remaining disks. As shown, following the write to the remaining disks (step 440), Disk 1/Address 100 (location 460) and Disk 2/Address 100 (location 465) both contain the word "Able" where before (see FIG. 3) the data in these locations was undefined. Processing would then continue to copy the word "Baker" to Disk 0/Address 200 and Disk 2/Address 200 and the word "Charlie" to Disk 1/Address 300 and Disk 2/Address 300. After failure recovery module 400 is completed, the data on each disk (Disk 0 (105), Disk 1 (110), and Disk 2 (115)) would be identical. The data on each disks would not only be consistent with one another, but each disk would also contain the latest data available.

Figure 5:
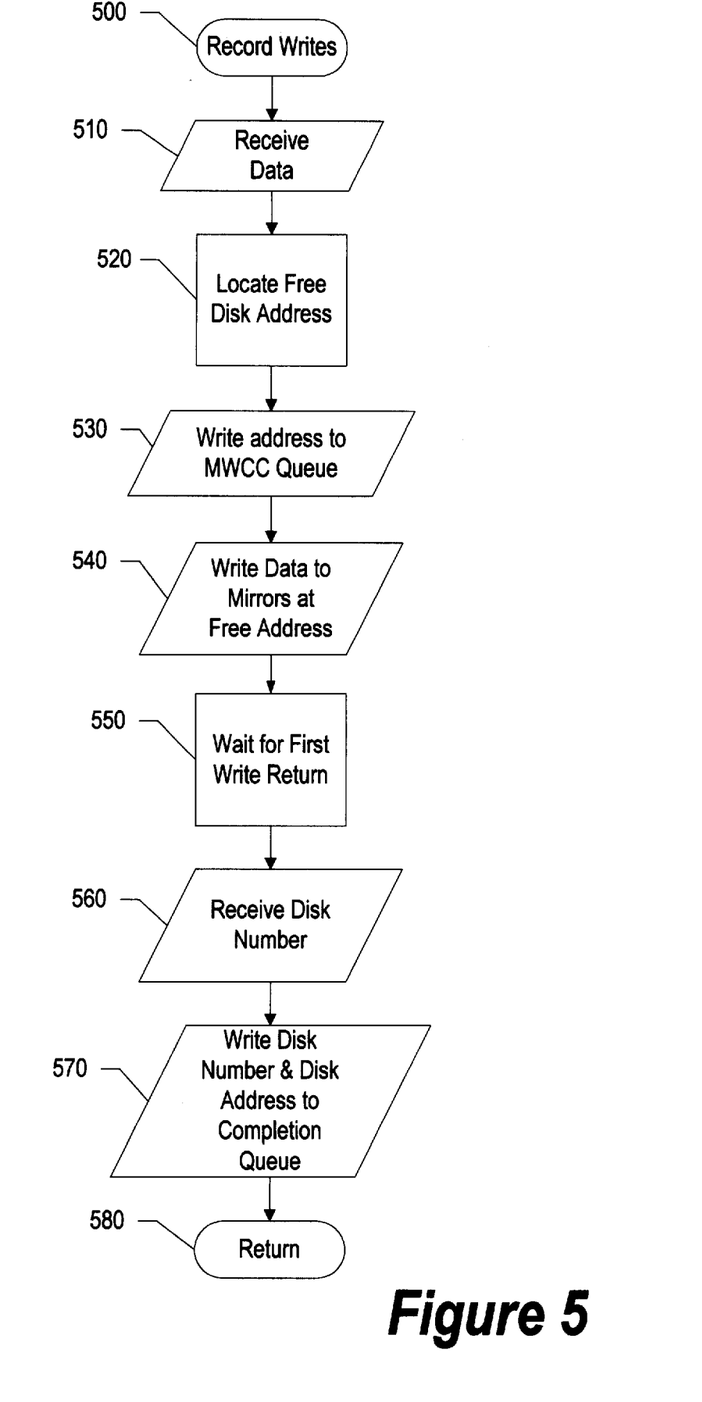
FIG. 5 is a flowchart for recording information to the mirror write consistency check array and the completion array during disk write operations.

FIG. 5 shows a flowchart for recording writes to the MWCC array and the completion array. Processing begins at step 500. Thereafter, the disk controller receives data to be written to the disk array (input 510). Next, the disk controller determines the disk address to store the data (step 520). This address may be determined by the disk controller or may be provided by a processor within the computer system. If a MWCC queue is being used, the address is written to the MWCC queue which is saved to the disk (output 530). The disk controller then issues parallel write commands writing the data to the disk location (output 540). A processing thread waits for the first return code issued from the parallel write command (step 550). The first return code is received and includes a disk number for the disk that first saved the data (input 560). The disk number and address are then written to the completion queue (output 570). The completion queue is preferably stored in a reserved memory area for fast access and to reduce time necessary to write the queue out to disk following each write operation. After the completion queue has been written, the record writes module completes and returns (step 580)

Figure 6:
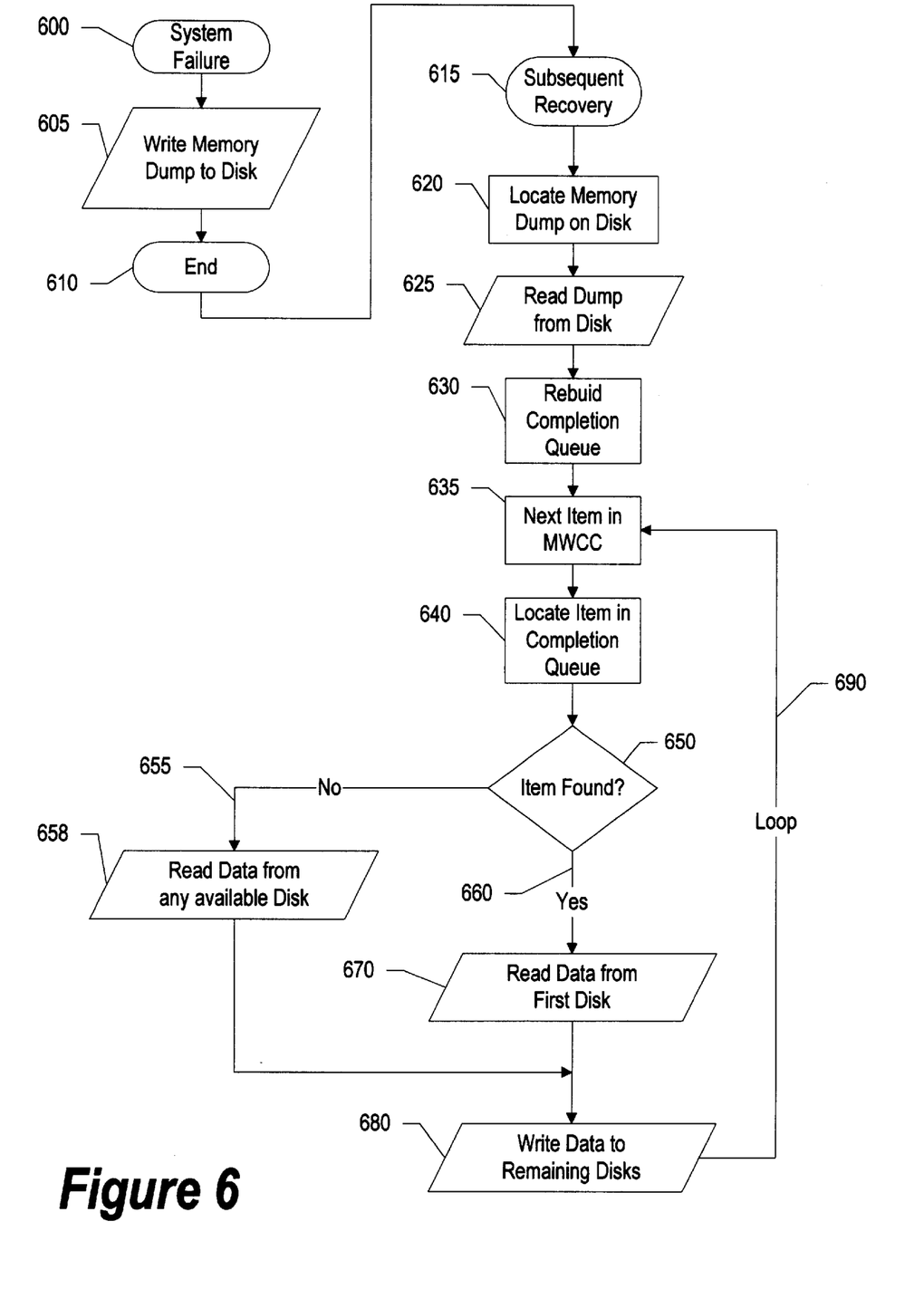
FIG. 6 is a flowchart for recovering from a system failure using both the mirror write consistency check array and the completion array.

FIG. 6 shows flowcharts of processing that occurs when a system failure occurs and when a subsequent recovery is performed. System failure routine 600 is performed when the system is failing. A small window of time exists when the system is failing that is used to write system status information to a recovery analysis image onto nonvolatile storage. Included in the system status information is the completion array which was stored in a reserved memory area. The reserved memory area storing the completion array is written to disk (output 605) before processing terminates (step 610).

During a subsequent recovery (step 615) the reserved memory that stored the completion array is located within the data dumped to disk in step 605 (step 620). Once located, the dump is read from disk (input 625) and used to rebuild the completion queue as it existed just prior to the system failure (step 630). The completion queue is then used in conjunction with the MWCC array to copy the last items of data written to the mirrored disk array before the system failed. The next item in the MWCC array is read (step 635). As described in FIG. 5, the MWCC array is stored on disk prior to each write by the disk controller to the parallel mirrored disks. The item is located in the completion queue (step 640) by matching the disk address stored in the MWCC array with disk addresses stored in the completion array. The recovery process then determines whether the item was located in the completion queue (decision 650). If the item was not found, indicating that the system failure occurred before the disk identifier and address was written to the completion array, "no" branch 655 is taken. "No" branch 655 receives data from the first available responding disk (input 658) and uses this data as the master data for copying to the other drives in the parallel mirror array set. On the other hand, if the item was found in the completion array, "yes" branch 660 is taken. During "yes" branch 660 processing, the data is read from the first disk to have stored the data (input 670). The disk number is included in the information provided in the completion array (see FIGS. 1–5). Using the data read from the disk/address provided by the completion array (or data from the first available responding disk read in step 658 if a matching address was not in the completion array) the data read is written back to the other mirrored disks (output 680). If a matching address was found in the completion array, each disk will contain not only consistent data but also the latest data available. After the data is written, loop 690 loops back to process the next item in the MWCC array (step 635). Processing continues until all items are processed from the MWCC array.

In one embodiment (described in FIG. 3), the MWCC is a FIFO queue containing the last 62 addresses to be written to the mirrored disks. In an alternative embodiment (described in FIG. 2), the MWCC array is not used and the completion array is processed in order to propagate the data to the other disks in the disk array.

Figure 7:
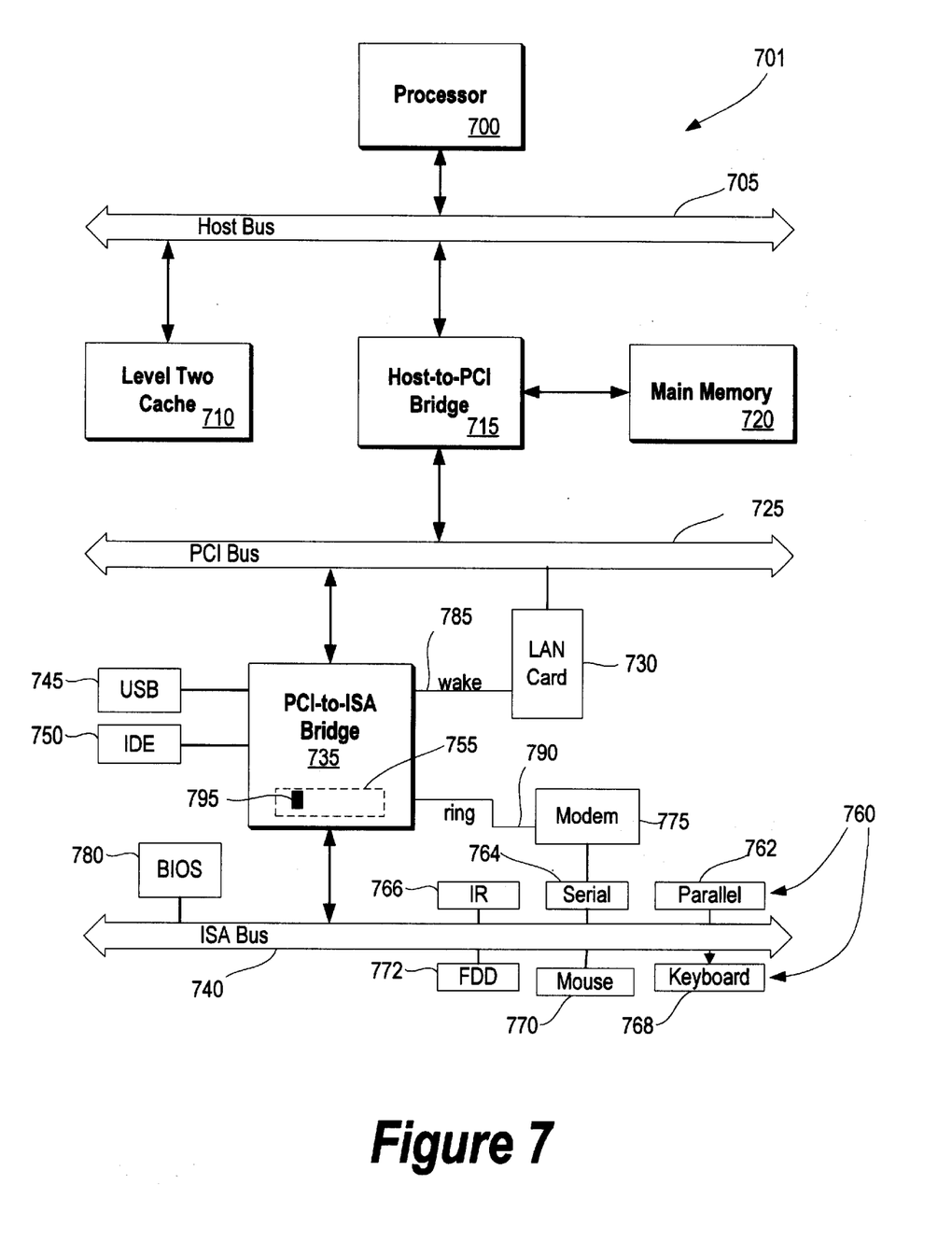
FIG. 7 is a block diagram of an information handling system capable of performing the present invention.

FIG. 7 illustrates information handling system 701 which is a simplified example of a computer system capable of performing the copy processing described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer system comprising:
   a computer including:
      one or more processors;
      a memory accessible by the one or more processors;
      a plurality of disks accessible by the one or more processors, each of the plurality of disks including a disk identifier and each of the plurality of disks including a plurality of disk addresses;
      one or more data units, each data unit stored at a disk address from the plurality of disk addresses;
      one or more first disk identifiers, each of the first disk identifiers corresponding to the first of the plurality of disks to store the corresponding data units;
      a memory area within the memory, the memory area including the stored disk addresses and the corresponding first disk identifiers;
   a recovery tool for recovering the plurality of disks from a computer system failure, the recovery tool including:
      means for locating the memory area;
      means for reading the disk addresses and the corresponding first disk identifiers from the memory area;
      means for reading the data stored at the corresponding unique disk addresses from the disks of the plurality of disks corresponding to the first disk identifiers; and
      means for writing the data to the other disks of the plurality of disks.

2. The computer system as described in claim 1 wherein the memory area is saved when the system failure occurs.

3. The computer system as described in claim 2 wherein the memory area is saved by storing the memory area in a reserved memory location within the memory, the reserved memory area being dumped to a nonvolatile storage area when the system failure occurs.

4. The computer system as described in claim 2 wherein the memory area is saved by storing the memory area on a nonvolatile storage device.

5. The computer system as described in claim 4 wherein the nonvolatile storage device includes at least one disk from the plurality of disks.

6. The computer system as described in claim 1 further comprising:
   one or more last disk identifiers, each of the last disk identifiers corresponding to the last of the plurality of disks to store the corresponding data units;
   a second memory area within the memory, the second memory area including the unique disk addresses and the corresponding last disk identifiers;
   wherein the recovery tool further includes means for reading the second memory area.

7. The computer system as described in claim 6 wherein the recovery tool further comprises:
   means for comparing the memory area with the second memory area to determine a disk from the plurality of disks that includes a most recently written copy of the data.

8. A computer program product in a computer usable medium for recovering data from mirrored disks, said computer program product comprising:
   means for writing data to a plurality of disks;
   means for identifying a disk from the plurality of disks that first stores the data;
   means for saving the identification in a memory area;
   means for reading the saved memory area following a system failure; and
   means for restoring the data to the plurality of disks.

9. The computer program product as described in claim 8 wherein the means for restoring further comprises:
   means for reading the data from the disk identified by the stored disk identifier and stored disk address; and
   means for writing the data to the other disks within the plurality of disks.

10. The computer program product as described in claim 8 wherein the means for saving the memory area includes means for saving the memory area in a reserved memory location, the reserved memory area being dumped to a nonvolatile storage area when the system failure occurs.

11. The computer program product as described in claim 8 wherein the means for saving the memory area includes means for saving the memory area to a nonvolatile storage area.

12. The computer program product as described in claim 8 further comprising:
   means for receiving a second signal from the last disk within the plurality of disks to complete writing the data;
   means for writing a second disk identifier and second disk address to a second memory area, the second disk identifier corresponding to the last disk to complete writing the data and the second disk address corresponding to the location of the saved data on the disk;

means for saving the second memory area onto a non-volatile storage device; and wherein the means for restoring further includes means for reading the second memory area from the nonvolatile storage device.

13. The computer program product as described in claim 12 wherein the means for restoring further comprises:

means for comparing the memory area with the second memory area to determine a disk from the plurality of disks that includes a most recently written copy of the data.

14. The computer program product as described in claim 8 wherein the means for restoring further comprises:

means for reading the data from the disk corresponding to the saved disk identifier and residing at the saved disk address; and means for writing the data to the disk address within the other disks of the plurality of disks.

15. A method for recovering data from a plurality of disks, said method comprising:

identifying at least one disk from the plurality of disks that contains a latest copy of data;

copying the latest copy of data from the identified disk to the other disks; and storing a disk identifier and a data address in a memory area, the disk identifier corresponding to the identified disk and the data address corresponding to the latest copy of data.

16. The method as described in claim 15 wherein the copying includes reading the disk identifier and the data address from the memory area to determine the latest copy of data.

17. The method as described in claim 15 further comprising storing the disk address and data address from the memory area to a nonvolatile storage device.

18. The method as described in claim 15 wherein the storing the disk identifier and the disk address in the memory area includes saving the memory area to a nonvolatile storage area.

19. The method as described in claim 18 wherein the storing is performed when a system failure occurs.

20. The method as described in claim 15 further comprising:

writing a second disk address to a second memory area prior to the storing, the second disk identifier corresponding to a disk address the data will be stored at in each of the plurality of disks;

saving the second memory area onto a nonvolatile storage device; and wherein the restoring further includes reading the second memory area from the nonvolatile storage device.

21. The method as described in claim 20 wherein the restoring further comprises:

comparing the memory area with the second memory area to determine a disk from the plurality of disks that includes a most recently written copy of the data.

22. The method as described in claim 15 wherein the restoring further comprises:

reading the data from the disk corresponding to the saved disk identifier and residing at the saved disk address; and writing the data to the disk address within the other disks of the plurality of disks.

* * * * *